United States Patent [19]

Tsunoda

[11] 4,408,452
[45] Oct. 11, 1983

[54] PUMPING-UP HYDROELECTRIC POWER PLANTS

[75] Inventor: Sachio Tsunoda, Yokohama, Japan

[73] Assignee: Tokyo Shibaura Denki Kabushiki Kaisha, Kanagawa, Japan

[21] Appl. No.: 212,145

[22] Filed: Dec. 2, 1980

[30] Foreign Application Priority Data

Dec. 28, 1979 [JP] Japan ................................ 54-173295

[51] Int. Cl.³ ............................................ F16D 31/02
[52] U.S. Cl. ...................................... 60/398; 415/500; 417/2
[58] Field of Search ................. 60/398; 290/52; 417/2; 415/143, 500

[56] References Cited

U.S. PATENT DOCUMENTS

| 1,411,145 | 3/1922 | Whitted | 417/2 |
| 3,214,915 | 11/1965 | Weibel | 60/398 |
| 3,817,658 | 6/1974 | Murase | 417/2 |
| 3,939,356 | 2/1976 | Loone | 290/52 |
| 4,204,808 | 5/1980 | Reese et al. | 417/2 |
| 4,318,004 | 3/1982 | Tsunoda | 415/500 |

FOREIGN PATENT DOCUMENTS

| 1503264 | 5/1970 | Fed. Rep. of Germany . | |
| 54-162039 | 12/1979 | Japan | 415/500 |

Primary Examiner—A. Michael Chambers
Attorney, Agent, or Firm—Stevens, Davis, Miller & Mosher

[57] ABSTRACT

In a pumping-up hydroelectric power plant comprising a single speed main pump/turbine and a booster pump operable in series in a pumping operation between an upper reservoir and a lower reservoir, a water head shared by said booster pump is varied depending on a variation in the static head between the two reservoirs for maintaining the operation of the main pump/turbine always in a maximum efficiency range.

3 Claims, 5 Drawing Figures

TO UPPER
RESERVIOR 15

PUMPING-UP HYDROELECTRIC POWER PLANTS

BACKGROUND OF THE INVENTION

This invention relates to a pumping-up hydroelectric power plant utilizing a single speed reversible pump/turbine and a booster pump operable in series when the pump/turbine is operated in the pumping mode.

Ordinarily, the single speed reversible pump/turbine has performance characteristics wherein the maximum efficiency points for the turbine operation and the pumping operation are different from each other. More specifically, the total head corresponding to the maximum efficiency operating point in the pumping mode of the single speed pump/turbine is considerably lower than the turbine net head corresponding to the maximum efficiency operating point in the turbine mode of the single speed pump/turbine. However, in an actual hydroelectric power plant, because of the friction loss in the waterpassage between the upper reservoir and the lower reservoir, the total head against which the pump/turbine is operated as a pump is larger than the turbine net head under which the pump/turbine is operated as a turbine. For this reason, when the pump/turbine has been designed to be operable in the turbine mode at a maximum efficiency under a head condition of the hydroelectric power plant, the efficiency of the same pump/turbine is remarkably reduced when the pump/turbine is operated in pumping mode under the same head condition.

In order to overcome this difficulty of the single speed reversible pump/turbine, there has been proposed a two speed pump/turbine which rotates for the pumping operation at a speed higher than that of the turbine operation. Although the two speed pump/turbine is advantageous in that it is operable at maximum efficiencies in both the turbine mode and the pumping mode under the same head condition of the hydroelectric power plant, the pump/turbine is found to be disadvantageous because of difficulties in the design and construction of the generator-motor directly coupled thereto.

For obviating the above described disadvantages, there has been proposed an arrangement comprising a single speed pump/turbine and a booster pump provided in a bypass portion on the draft tube side of the same pump/turbine so that the pump/turbine and the booster pump are operated in series against a head condition of the power plant.

An example of such arrangement is shown in FIG. 1, in which numeral 1 designates the single speed pump/turbine directly coupled with a reversible generator-motor 2. A penstock 3 connects the reversible pump/turbine 1 with an upper reservoir (15), whereas a draft tube 4 and a draft tunnel 5 connect the reversible pump/turbine 1 with a lower reservoir 6. A water regulator 13 such as a guide vane is ordinarily provided between the penstock 3 and the pump/turbine 1.

A by-pass conduit 7 is provided for by-passing one portion of the draft tunnel 5, and a booster pump 9 directly coupled with a driving motor 8 is provided in the by-pass conduit 7 extending between two branching points. The by-pass conduit 7 may otherwise be so constructed that one end of the conduit 7 remote from the main pump/turbine 1 is further extended to open in the lower reservoir 6.

In the above described arrangement, a transfer valve 10 is further provided at a branching point, near the pump/turbine 1, of the by-pass conduit 7, while a stop valve 11 is provided in the portion of the draft tunnel 5 by-passed by the by-pass conduit 7. Furthermore, guide vanes (not shown) are provided in the penstock 3 at an end thereof adjacent to the pump/turbine 1.

When the reversible pump/turbine 1 is operated in the turbine mode, the transfer valve 10 and the stop valve 11 are operated to close the by-pass conduit 7 and to open the draft tunnel 5 respectively, and the guide vanes are opened to cause the water in the penstock 3 to flow into the pump/turbine 1.

The pump/turbine 1 is then driven in the turbine mode to operate the generator-motor 2 directly coupled therewith in the generator mode. The water discharged from the pump/turbine then flows through the draft tube 4 and the draft tunnel 5 into the lower reservoir 6.

In a case where the reversible pump/turbine 1 is operated as a pump, the transfer valve 10 and the stop valve 11 are operated to open the by-pass conduit 7 and to close the by-passed portion of the draft tunnel 5. Then, the generator-motor 2 directly coupled to the pump/turbine 1 and the motor 8 for driving the booster pump 9 are both energized to operate the pump/turbine 1 and the booster pump 9 in series so that the water in the lower reservoir 6 is pumped-up through the by-pass conduit 7, draft tunnel 5, draft tube 4, and the penstock 3 into the upper reservoir (not shown).

In FIG. 2, there are indicated performance characteristics of the main pump/turbine 1 in the pumping mode, the booster pump 9, and the series combination of the pump/turbine 1 and the booster pump 9, with total head H and efficiency $\eta$ indicated along the ordinate and water discharge Q indicated along the abscissa.

More specifically, a curve $L_a$ represents a variation in the total head H of the main pump/turbine when the latter is operated in pumping mode at the rated speed; a curve $L_b$ represents a variation in efficiency $\eta$ of the main pump/turbine 1 when the same is operated under the same condition; and a curve $L_c$ represents a variation in the total head H of the booster pump 9 when the latter is operated at a rated speed $N_{b0}$. Furthermore, a curve $L_d$ represents a variation in the total head H of the series combination of the turbine 1 and the booster pump 9, where the booster pump 9 is operated at the rated speed $N_{b0}$.

Assuming that $H_1$ represents a total head required for pumping-up water from the lower reservoir to the upper reservoir, a horizontal line $H=H_1$ intersects the curve $L_d$ representing the series combination of the main pump/turbine 1 and the booster pump 9 at a point $P_1$ corresponding to the operating point of the hydroelectric power plant. Since the two machines 1 and 9 are operated in series, the quantity of water discharged from these machines is equal to $Q_1$ along the abscissa corresponding to the point $P_1$. Thus, the operating points of the main pump/turbine 1 and the booster pump 9 are represented by $P_{m1}$ and $P_{b1}$, respectively, while the efficiency of the main pump/turbine 1 operating at the point $P_{m1}$ is made to be approximately equal to the maximum value $\eta_{m1}$. Representing the total heads corresponding to the operating points $P_{m1}$ and $P_{b1}$ by $H_{m1}$ and $H_{b1}$ respectively, the sum of the total heads $H_{m1}$ and $H_{b1}$ is of course equal to $H_1$.

Comparing the efficiency $\eta_{m1}$ of this case with an efficiency $\eta_{m0}$ corresponding to the operating point $P_{m0}$ where only the pump/turbine 1 is operated against the total head $H_1$, it is apparent that the efficiency in the pumping operation of the pump/turbine 1 is remarkably improved by operating the pump/turbine 1 in series with the booster pump 9.

This arrangement, however, has a difficulty in that when the total head of the power plant varies from the above described value $H_1$ to a value $H_2$, the operating point of the power plant is shifted from the above described point $P_1$ to another intersecting point $P_2$ between the curve $L_d$ and a horizontal line $H=H_2$.

As a result, the operating points of the main pump/turbine and the booster pump are shifted to $P_{m2}$ and $P_{b2}$ respectively, and the efficiency of the main pump/turbine is varied from $\eta_{m1}$ to $\eta_{m2}$ which is considerably lower than $\eta_{m1}$.

In other words, the arrangement of the hydroelectric power plant comprising a main pump/turbine and a booster pump operable in series for sharing the total head of the hydroelectric power plant therebetween has a difficulty in that the efficiency of the main pump/turbine is reduced when the total head of the power plant is varied by, for instance, a variation in the static head between the upper reservoir and the lower reservoir.

SUMMARY OF THE INVENTION

A primary object of the present invention is to provide a pumping-up hydroelectric power plant including a main pump/turbine and a booster pump operable in series in a pumping-up operation.

Another object of the invention is to provide a pumping-up hydroelectric power plant as described above, wherein the main pump/turbine is made operable in a maximum efficiency range regardless of a wide variation in the head condition of the power plant.

Still another object of the invention is to provide a pumping-up hydroelectric power plant of the above described type, wherein the rotating speed of the booster pump as well as the degree of opening of guide vanes are controlled in accordance with the head condition.

According to the present invention, there is provided a pumping-up hydroelectric power plant comprising a main hydraulic machine operable as a pump at a constant speed between an upper reservoir and a lower reservoir, and a booster pump provided in a water passage of the main hydraulic machine to be operable in series therewith, wherein the booster pump is directly coupled with a variable speed driving device and a control device is further provided for controlling the rotating speed of the driving device in response to a control signal corresponding to a difference between water levels in the upper and lower reservoirs.

Preferably, the main hydraulic machine is a reversible pump/turbine.

Alternatively, the opening of a water passage on the discharge side of the hydraulic machine is made controllable depending on the difference between the water levels between the two reservoirs.

DESCRIPTION OF THE PREFERRED EMBODIMENTS

Figure 1:
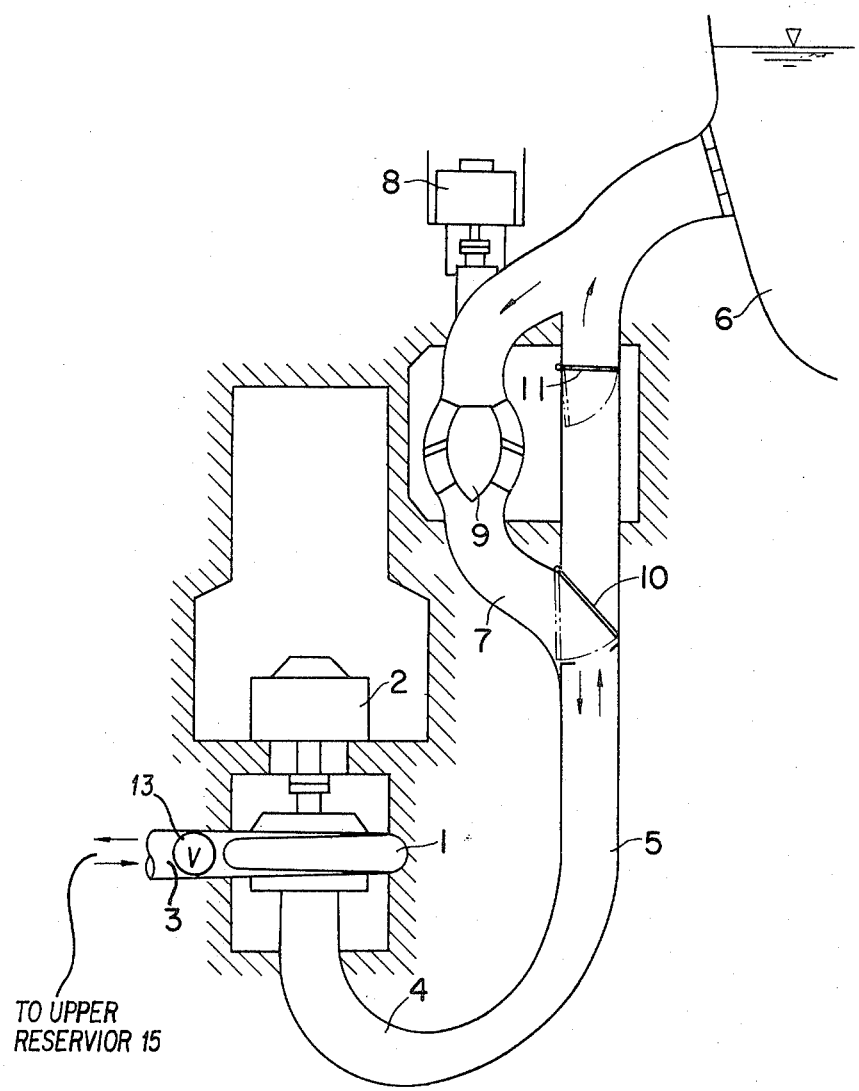
FIG. 1 is a diagram generally showing a pumping-up hydroelectric power plant to which the present invention is applicable.
Figure 2:
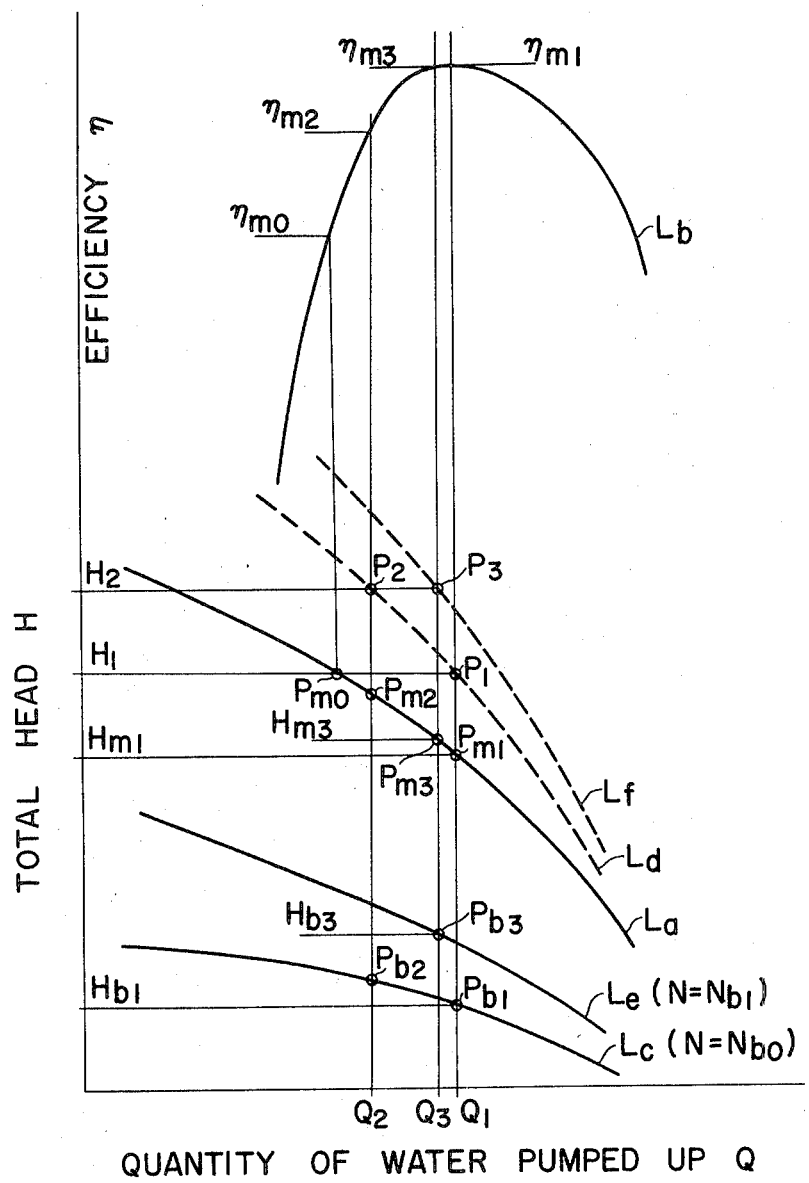
FIG. 2 is a graphical representation of total heads and efficiency with respect to the quantity of water discharged from the power plant.

Preferred embodiments of the present invention, which are applicable to a pumping-up hydroelectric power plant shown in FIG. 1, will now be described with reference to FIGS. 3 and 4.

Figure 3:
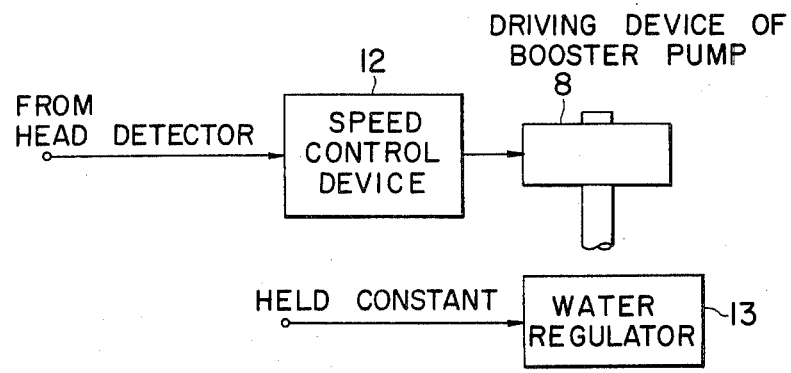
FIG. 3 is a block diagram showing one embodiment of the present invention.
Figure 5:
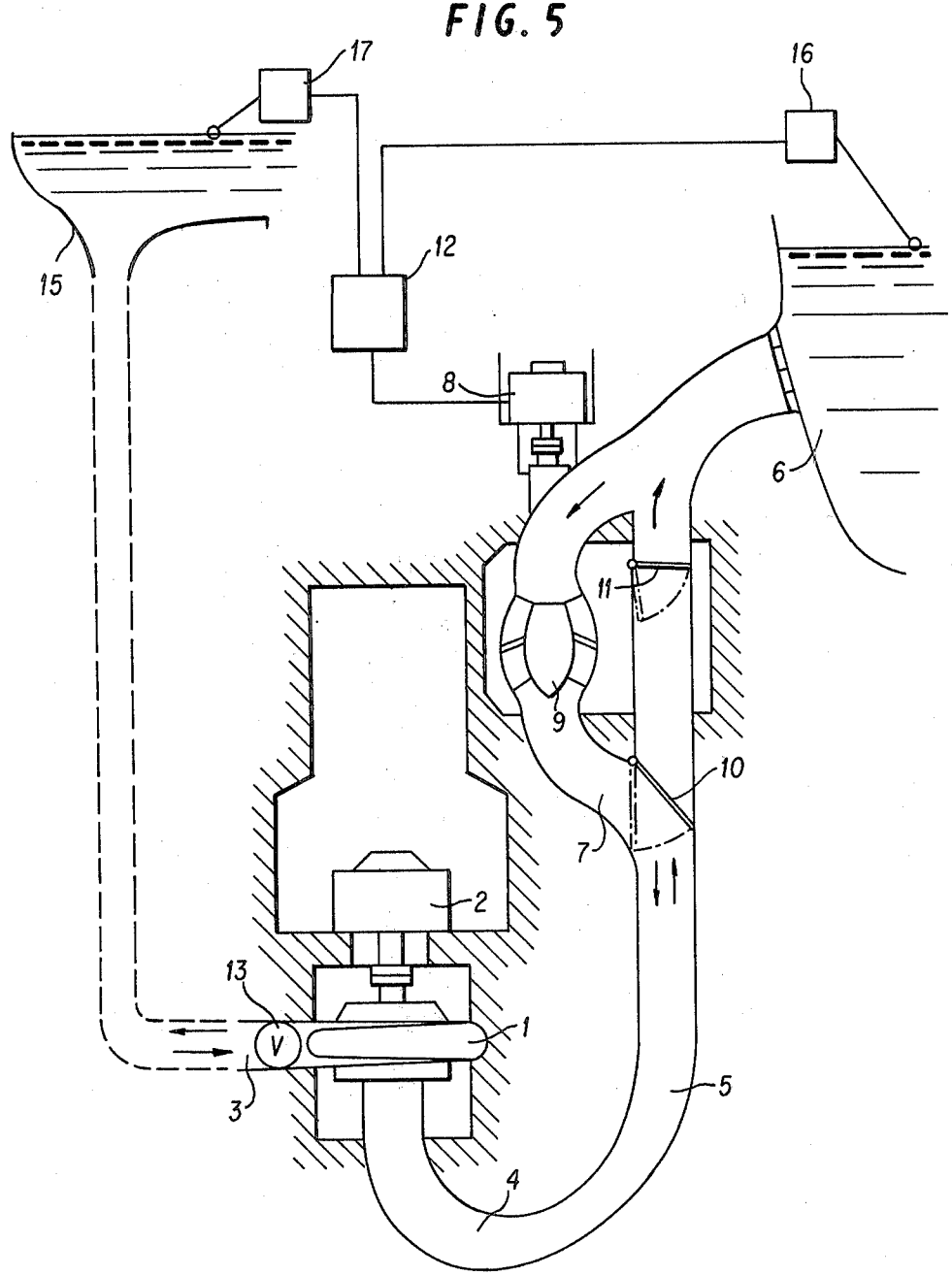
FIG. 5 is a diagram showing the pumping-up hydroelectric power plant of FIG. 1 fitted with the invention.

In an embodiment shown in FIG. 3, the driving motor directly coupled to the booster pump is of a variable speed type. The embodiment further comprises detectors 16 and 17 (FIG. 5) for detecting variation in the static head of the power plant, and a speed control device 12 for controlling the rotating speed of the driving motor in response to the variation of the static head detected by the detectors 16 and 17. When a water regulator 13 such as guide vanes is provided for regulating the opening of the penstock, the regulator 13 is held inoperative in this embodiment. The control of the driving motor may be continuous or stepwise.

When the control of the driving motor is stepwise, the control device 12 controls the rotating speed of the driving motor 8 in a manner such that when the static head is within a predetermined range, the motor 8 is held at the rated speed $N_{b0}$. However, when the static head exceeds the predetermined range, the rotating speed of the motor 8 is increased from $N_{b0}$ to $N_{b1}$, while when the static head is reduced below the predetermined range, the motor 8 is controlled to reduce its driving speed below the rated speed $N_{b0}$.

As described before, when the booster pump is operated in series with the main pump/turbine at the rated speed $N_{b0}$ for pumping-up water against a total head $H_1$, the main pump/turbine 1 is operated at the maximum efficiency point $P_{m1}$ of the pumping operation.

However, when the static head is increased to increase the total head for the combination of two machines from $H_1$ to $H_2$, the control device 12 operates to increase the rotating speed of the driving motor 8 from $N_{b0}$ to $N_{b1}$ as described above. Thus, the relation between the quantity of water Q discharged and total head H for the booster pump changes from the curve $L_c$ to a curve $L_e$ wherein the quantity of water Q discharged is varied in proportion to $N_{b1}/N_{b0}$, and total head H is varied in proportion to $(N_{b1}/N_{b0})^2$.

Furthermore, the total head for the hydroelectric power plant is represented by a curve $L_f$ corresponding to the sum of the total head for the main pump/turbine represented by the curve $L_a$ and the total head for the booster pump represented by the curve $L_e$, and the operating point of the same combination is represented by $P_3$ corresponding to the intersecting point between the horizontal line $H=H_2$ and the curve $L_f$.

The individual operating points of the main pump/turbine and the booster pump during the above described operation are represented by $P_{m3}$ and $P_{b3}$ on the curves $L_a$ and $L_e$ respectively, and the efficiency of the main pump/turbine at the operating point $P_{m3}$ is found to be $\eta_{m3}$ which is higher than $\eta_{m2}$ corresponding to the operating point $P_2$ where the booster pump is operated at the rated speed $N_{b0}$.

When the total head of the hydroelectric power plant is reduced by a reduction of the static head, the rotating speed of the driving motor 8 is reduced for maintaining the operation of the main pump/turbine in a maximum efficiency range in a manner reverse to that described above.

The above description concerns the stepwise control of the booster speed. However, it is apparent that the rotating speed of the booster pump can also be controlled continuously although a speed control device 12 of somewhat complicated construction is required, and by so controlling the booster pump, the main pump/turbine can be always operated in the maximum efficiency range in spite of a wide variation in the head condition of the hydroelectric power plant.

In a case where a water regulator 13 such as guide vanes are provided on the penstock side of the main pump/turbine, it is widely known that the maximum efficiency range in the pumping operation of the pump/turbine can be shifted toward a high head region or a low head region by changing the degree of opening of the guide vanes or water regulator 13 suitably.

Figure 4:
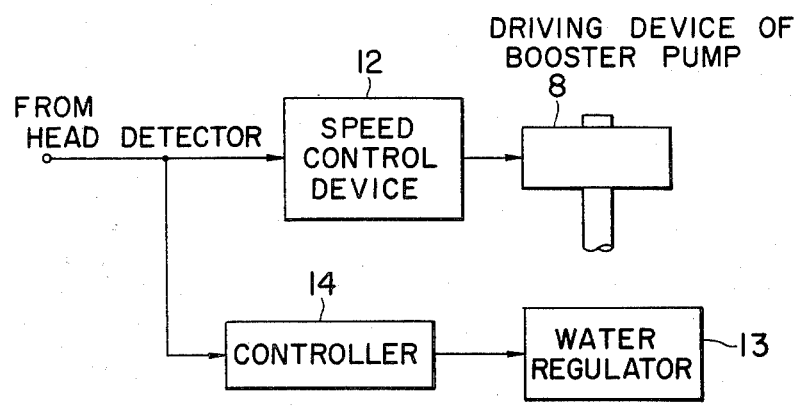
FIG. 4 is a block diagram showing another embodiment of the present invention.

Thus where the total head of the power plant varies widely, the maximum efficiency operation of the pump/turbine can be achieved more easily by not only controlling the rotating speed of the booster pump as described with reference to FIG. 3, but also by controlling the degree of opening of the water regulator 13 or the guide vanes under the control of a controller 14 as shown in FIG. 4. That is, when the total head for the power plant increases, the opening of the water regulator 13 is so controlled that the maximum efficiency range of the pump/turbine is in a comparatively high head region, and when the total head of the power plant reduces, the degree of opening of the guide vanes 13 is so controlled that the maximum efficiency range of the same is in a comparatively low head region.

We claim:

1. In a pumping-up hydroelectric power plant comprising a single speed reversible pump/turbine operable as a pump at a constant speed between an upper reservoir and a lower reservoir, and a booster pump provided in a water passage of the single speed reversible pump/turbine to be operable in series therewith only when the pump/turbine is operated as a pump, the improvement comprising a driving device directly coupled with said booster pump for driving the same at a variable speed, means for detecting water levels in said two reservoirs, means for providing a control signal corresponding to a difference between the water levels thus detected, and a control device for controlling the rotating speed of said driving device in response to said control signal so that said pump/turbine is operated at its maximum pumping efficiency regardless of variations in the water levels in said two reservoirs.

2. A pumping-up hydroelectric power plant as set forth in claim 1 wherein a degree of opening of a water passage on the discharge side of said reversible pump/turbine when it is operating as a pump, is made controllable depending on the difference beween the water levels in the upper reservoir and the lower reservoir.

3. A pumping-up hydroelectric power plant as set forth in claim 2 wherein the control of the degree of opening of the water passage is effectuated by controlling guide vanes provided for the reversible pump/turbine.

* * * * *

UNITED STATES PATENT AND TRADEMARK OFFICE
CERTIFICATE OF CORRECTION

PATENT NO. : 4,408,452
DATED : October 11, 1983
INVENTOR(S) : Sachio TSUNODA et al It is certified that error appears in the above-identified patent and that said Letters Patent is hereby corrected as shown below:

On the title page

Under the designation "Inventors", please add the following 2 inventors:

--Kaneo SUGISHITA of Yokohama, Japan and
Kaiichiro HIRAYAMA of Tokyo Japan--.

Signed and Sealed this

Thirteenth Day of March 1984

[SEAL]

Attest:

*Attesting Officer*

GERALD J. MOSSINGHOFF

*Commissioner of Patents and Trademarks*